(12) United States Patent
Zhong et al.

(10) Patent No.: US 11,576,383 B2
(45) Date of Patent: Feb. 14, 2023

(54) PESTICIDE COMPOSITION CONTAINING THIDIAZURON AND POLYGLUTAMIC ACID

(71) Applicant: JIANGSU HUIFENG BIO AGRICULTURE CO., LTD., Jiangsu (CN)

(72) Inventors: Hangen Zhong, Yancheng (CN); Hongjin Ji, Yancheng (CN); Ming Zhang, Yancheng (CN)

(73) Assignee: JIANGSU HUIFENG BIO AGRICULTURE CO., LTD., Yancheng (CN)

( * ) Notice: Subject to any disclaimer, the term of this patent is extended or adjusted under 35 U.S.C. 154(b) by 294 days.

(21) Appl. No.: 16/754,910

(22) PCT Filed: Sep. 10, 2018

(86) PCT No.: PCT/CN2018/104849
§ 371 (c)(1),
(2) Date: Apr. 9, 2020

(87) PCT Pub. No.: WO2019/072061
PCT Pub. Date: Apr. 18, 2019

(65) Prior Publication Data
US 2020/0260731 A1    Aug. 20, 2020

(30) Foreign Application Priority Data
Oct. 9, 2017  (CN) .......................... 201710929416.5

(51) Int. Cl.
A01N 47/36 (2006.01)
A01N 37/44 (2006.01)
A01N 37/46 (2006.01)
A01N 43/82 (2006.01)

(52) U.S. Cl.
CPC ............. *A01N 47/36* (2013.01); *A01N 37/44* (2013.01); *A01N 37/46* (2013.01); *A01N 43/82* (2013.01)

(58) Field of Classification Search
None
See application file for complete search history.

(56) References Cited

U.S. PATENT DOCUMENTS

2017/0166488 A1* 6/2017 Chaudhry ................ C05G 3/00

FOREIGN PATENT DOCUMENTS

| CN | 101103727 A | * | 1/2008 |
|---|---|---|---|
| CN | 102584496 A | | 7/2012 |
| CN | 105916376 A | | 8/2016 |
| CN | 106259464 A | | 1/2017 |
| CN | 106900730 A | | 6/2017 |
| CN | 106962381 A | | 7/2017 |
| CN | 107616184 A | | 1/2018 |

OTHER PUBLICATIONS

Machine translation, CN 101103727 A (Year: 2008).*
Liu et al.; "Mechanism effect and application of a new plant growth regulator thidiazuron;" Xinjiang Agricultural Reclamation Technology; 2011; No. 2.
Peng et al.; "Application of γ-polyglutamic acid—a new type of biogenic stimulant in agriculture;" Phosphate & Compound Fertilizer; 2017; pp. 24-25; vol. 32, No. 3.
Dec. 3, 2018 Search Report issued in International Patent Application No. PCT/CN2018/104849.

* cited by examiner

*Primary Examiner* — Bethany P Barham
*Assistant Examiner* — Barbara S Frazier
(74) *Attorney, Agent, or Firm* — Oliff PLC

(57) ABSTRACT

A pesticide composition, preparation method and use thereof; the composition having a synergism effect, including effective components A and B, wherein the active component A is thidiazuron, the active component B is polyglutamic acid, and the weight ratio of the component A to the component B is 1:(0.01-200).

12 Claims, No Drawings

PESTICIDE COMPOSITION CONTAINING THIDIAZURON AND POLYGLUTAMIC ACID

BACKGROUND

Technical Field

The present invention belongs to the field of agricultural plant protection, and particularly relates to a pesticide composition having improved performance, in particular to a pesticide composition containing thidiazuron and polyglutamic acid.

Related Art

Thidiazuron, a novel efficient plant growth regulator, can promote natural fall of separating tissues between petioles and stems after being absorbed by plants, and can be widely applied to pesticides and fertilizers. Thidiazuron with extremely high bioactivity is many times higher than common cytokinins in ability of inducing plant cell division and callus formation. Thidiazuron improves the absorbing ability and increases photosynthesis of crops so as to achieve the purposes of increasing production and high-quality crops. Thidiazuron can be either used for crops, such as melons, fruits, vegetables, nursery stocks, flowers and plants, cereals, and tobacco, or used for tissue culture, genetic engineering and the like. Thidiazuron can improve the crop output and improve the quality obviously in production, is small in dose and free of pollution to ecological environment, and has the characteristics of being non-toxic to human, livestock, birds, honeybees, natural enemies and the like.

Polyglutamic acid, also called natto gum and poly-1-glutamic acid, is a water soluble, biodegradable and non-toxic biomacromolecule prepared by a microbiological fermentation method. Polyglutamic acid is a class of homogeneous polyamino acids formed by polymerizing glutamic monomers through amido bonds and has the advantages of excellent biodegradability, super adsorbability, non-toxicity and the like. Added into a compound fertilizer, polyglutamic acid has multiple functions of reducing nutrient loss of the fertilizer, improving the utilization ratio of the fertilizer, regulating plant growth and the like. Polyglutamic acid has an obvious application effect on plants such as rice, wheat, maize, vegetables, fruit trees and flowers and plants, and can improve the crop output obviously.

It has been shown by actual pesticide experience that repeated and single application of an active compound to prevent and treat harmful fungi will lead to rapid selectivity of fungi strains in many cases. In order to reduce the risk of selectivity of resistant fungi strains, a mixture of different active compounds is usually used to prevent and treat harmful fungi at present. Resistance generation can be delayed by combining the active compounds with different mechanisms of action, so that the application amount is reduced and the prevention and treatment cost is lowered.

SUMMARY

An objective of the present invention is to provide a pesticide composition having a synergism effect so as to promote growth of crops and improve disease resistance and output of the crops. It is found by the inventors that thidiazuron and polyglutamic acid have an obvious synergism effect in regulating or promoting growth of plants.

Another objective of the present invention is to provide a preparation method of a plant growth regulator composition comprising effective components A and B and application of the plant growth regulator composition in regulating and promoting growth of crops in an agricultural field.

The objectives of the present invention can be achieved by the following measures:

The pesticide composition having a synergism effect comprises active components A and B. The active component A is thidiazuron, and the active component B is polyglutamic acid. The weight ratio of the active component A to the active component B is 1:(0.01-200). In a preferred embodiment, the weight ratio of the active component A to the active component B is 1:(0.011-180), further preferably 1:(0.0125-180) or 1:(0.012-170) to make the action effect more obvious.

In a preferred embodiment, the weight ratio of the active component A to the active component B may be either adjusted at random within the following range of ratios: 100:1, 95:1, 90:1, 85:1, 80:1, 75:1, 70:1, 65:1, 60:1, 55:1, 50:1, 45:1, 40:1, 35:1, 30:1, 29:1, 28:1, 27:1, 26:1, 25:1, 24:1, 23:1, 22:1, 21:1, 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:15, 1:20, 1:25, 1:30, 1:31, 1:32, 1:33, 1:34, 1:35, 1:36, 1:37, 1:38, 1:39, 1:40, 1:41, 1:42, 1:43, 1:44, 1:45, 1:46, 1:47, 1:48, 1:49, 1:50, 1:51, 1:52, 1:53, 1:54, 1:55, 1:56, 1:57, 1:58, 1:59, 1:60, 1:61, 1:62, 1:63, 1:64, 1:65, 1:66, 1:67, 1:68, 1:69, 1:70, 1:71, 1:72, 1:73, 1:74, 1:75, 1:76, 1:77, 1:78, 1:79, 1:80, 1:81, 1:82, 1:83, 1:84, 1:85, 1:86, 1:87, 1:88, 1:89, 1:90, 1:91, 1:92, 1:93, 1:94, 1:95, 1:96, 1:97, 1:98, 1:99, 1:100, 1:102, 1:103, 1:104, 1:105, 1:106, 1:107, 1:108, 1:109, 1:110, 1:111, 1:112, 1:113, 1:114, 1:115, 1:116, 1:117, 1:118, 1:119, 1:120, 1:121, 1:122, 1:123, 1:124, 1:125, 1:126, 1:127, 1:128, 1:129, 1:130, 1:131, 1:132, 1:133, 1:134, 1:135, 1:136, 1:137, 1:138, 1:139, 1:140, 1:141, 1:142, 1:143, 1:144, 1:145, 1:146, 1:147, 1:148, 1:149, 1:150, 1:151, 1:152, 1:153, 1:154, 1:155, 1:156, 1:157, 1:158, 1:159, 1:160, 1:161, 1:162, 1:163, 1:164, 1:165, 1:166, 1:167, 1:168, 1:169, 1:170, 1:171, 1:172, 1:173, 1:174, 1:175, 1:176, 1:177, 1:178, 1:179, 1:180, 1:181, 1:182, 1:183, 1:184, 1:185, 1:186, 1:187, 1:188, 1:189, 1:190, 1:191, 1:192, 1:193, 1:194, 1:195, 1:196, 1:197, 1:198, 1:199 and 1:200, or selected within a range consisting of any two ratios. The ratios may be interpreted as either the weight ratio or a molar ratio.

Polyglutamic acid (PGA) is primarily formed by polymerizing D-glutamic acid and L-glutamic acid through amido bonds. As a result of different polymerizing modes, polyglutamic acid primarily comprises two configurations: α-polyglutamic acid (polymerized through α-amido bonds, α-PGA) and γ-polyglutamic acid (polymerized through γ-amido bonds, γ-PGA). Polyglutamic acid in the present invention is in a form of γ-polyglutamic acid, abbreviated as polyglutamic acid (a structural formula of polyglutamic acid is shown as follows) in the present invention.

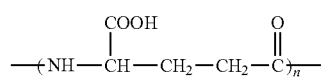

Structure of γ-polyglutamic acid (γ-PGA)

It is found by the inventors through tests that the composition of the present invention can be used for better regulating growth of crops, promoting health benefit of crops and improving the crop output.

The present invention provides use of the composition comprising the component A (thidiazuron) and the component B (polyglutamic acid) in regulating growth of crops in an agricultural field, in particular use of the composition in regulating growth, improving disease-resistant effect and the like in the aspects of rice, wheat or fruit trees.

In order to give full play to advantageous effects of the composition of the present invention, the composition of the present invention may be also mixed with other pesticides (for example, a bactericide, an insecticide, a herbicide and a plant growth regulator), fertilizers and the like for use. These pesticides or fertilizers mixed with the composition are common pesticides or fertilizers used in the prior art.

The composition of the present invention may be prepared into a dosage form permissible in pesticide from the active components and a pesticide adjuvant.

The composition may particularly comprise a pesticide adjuvant, for example, one or more of a carrier, a solvent, a dispersant, a wetting agent, a tackifier, a thickener, an adhesive, a surfactant and the like. The composition may be mixed with common adjuvants in the application progress.

Proper adjuvants may be solids or liquids which are usually common substances used in a dosage form processing course, for example, a natural or regenerated mineral substance, a solvent, a dispersant, a wetting agent, a tackifier, a thickener, an adhesive or a fertilizer.

An application method of the composition of the present invention comprises applying the composition of the present invention to overground parts of growing plants, in particular, leaves or leaf surfaces. The composition may be used for soaking seeds or may be smeared to the surface of an object needing protection and treatment. Growing places of plants, for example, rice fields, may be soaked with a liquid preparation of the composition, or the composition may be applied to soil in a form of solid, for example, the composition may be applied to soil in a form of particles. The composition may enter plant bodies (systemic action) via roots of the plants from soil.

These compositions either may only comprise the active components for application or may be mixed with additives (pesticide adjuvants) for use.

The composition of the present invention may be prepared into a dosage form acceptable in pesticide, such as an aqueous solution, a suspending agent, a soluble liquid, an oil suspending agent, water dispersible granules, a microemulsion, wettable powder and the like. The compositions may be applied by spraying, atomizing, powder spraying, sowing or splashing in accordance with properties of the compositions, purposes achievable by applying the compositions and environmental conditions.

The composition of the present invention can be prepared into various dosage forms by means of known methods. The active components and the adjuvant, for example, a solvent and a solid carrier may be uniformly mixed with a surfactant and ground if needed to prepare needed dosage forms.

The above solvent may be selected from aromatic hydrocarbons with 8-12 carbon atoms preferably, for example, an xylene mixture or substituted benzene, phthalates, such as dibutyl phthalate or dioctyl phthalate, aliphatic hydrocarbons, such as cyclohexane or paraffin, alcohol, ethylene glycol and their ethers and esters, such as ethanol, ethylene glycol and monomethyl ethylene glycol, ketones, such as cyclohexanone, a strongly polar solvent, such as N-methyl-2-pyrrolidone, dimethyl sulfoxide or dimethylformamide, and vegetable oil or plant oil, such as soybean oil.

The above solid carrier, for example, for the wettable powder and a dispersant is usually a natural mineral filler such as talc, kaolin, montmorillonite or activated clay. In order to manage physical properties of the composition, highly dispersible silicic acid or a highly dispersible adsorption polymer carrier, for example, a granular adsorption carrier or a non-adsorption carrier, may be also added. The proper granular adsorption carrier is, for example, pumice stones, bentonite or bentonite. The proper non-absorption carrier is, for example, calcite or sand. In addition, a lot of inorganic or organic materials prefabricated to granules may be used as carriers, in particular, dolomite.

According to chemical properties of the effective components in the composition of the present invention, the proper surfactant is lignosulfonic acid, naphthalene sulfonic acid, phenolsulfonic acid, an alkaline-earth metal salt or an amine salt; alkylarylsulfonate; alkyl sulfate; alkyl sulfonate; fatty alcohol sulphate; fatty acid and sulfated fatty alcohol ethylene glycol ether; a condensation compound of sulfonated naphthalene and naphthalene derivative and formaldehyde; a condensation compound of naphthalene or naphthalene sulfonic acid, and phenol and formaldehyde; polyoxyethyleneoctyl phenyl ether; ethoxylatedisooctyl phenol; octyl phenol; nonyl phenol; alkylarylpolyglycol ether; tributylbenzenepolyglycol ether; tristearylphenylpolyglycol ether; alkylaryl polyether alcohol; ethoxylatedcaster oil; polyoxyethylene alkyl ether; an ethylene oxide condensation compound; ethoxylated polypropylene oxide; lauratepolyglycol ether acetal; sorbitan ester; lignin sulfite waste liquor; and methylcellulose.

The plants in the present invention include, but not limited to, indica, maize and the like.

The two effective components in the composition of the present invention show a synergism effect. The activity of the composition is more obvious than expected sum of activity of single compounds and individual activity of the single compounds. Other characteristics of the composition of the present invention are primarily shown as follows: 1, the blending of the composition of the present invention has an obvious synergism effect; 2, as the two single dosages of the composition differ greatly in chemical structure, are different in mechanism of action completely and have no cross resistance, the resistance problem caused by individual use of the two single dosages can be alleviated; and 3, the composition of the present invention can regulate growth of plants well, improve disease resistance and stress resistance, promote health benefit of crops and improve the crop output.

DETAILED DESCRIPTION

In order to make the purposes, technical schemes and advantages of the present invention clearer, the present invention is further described in detail below in combination with examples. It should be understood that the specific examples described herein are only used for explaining the present invention, instead of limiting the present invention. Any modification, equivalent replacement, improvement, etc. made within the spirit and principle of the present invention shall be regarded as within the protection scope of the present invention.

The percent in all formulae of the examples below is weight percent (converted into percent). All technological processes of various preparations of the composition of the present invention are prior art, and can be changed somewhat according to different conditions.

I. Examples for Preparation of Dosage Forms (I) Processing and Examples of Dispersible Oil Suspending Agent Components such as a dispersant, a wetting agent, a thickener and water were uniformly mixed according to a proportion of a formula; first, an emulsifier, the dispersant, the wetting agent, a stabilizer and a dispersion medium were added into a reaction kettle, and mixed and dispersed uniformly; and an antifreezing agent and the thickener were added into the reaction kettle in a high speed shearing state, and active components polyglutamic acid and thidiazuron were sanded in the presence of a zirconium bead grinding medium to prepare the dispersible oil suspending agent containing polyglutamic acid and thidiazuron.

Example 1: 2.025% Thidiazuron•Polyglutamic Acid Dispersible Oil Suspending Agent 2% of thidiazuron, 0.025% of polyglutamic acid, 6% of a diphenyl phenol polyoxyethylenepolyformaldehyde condensation compound, 2% of isopropanol, 1% of ammonium sulfate, 15% of alkylbenzenenaphthalenesulfonate and the balance methyl oleate, totaling 100%.

Example 2: 6.6% Thidiazuron•Polyglutamic Acid Dispersible Oil Suspending Agent

6% of thidiazuron, 0.6% of polyglutamic acid, 5% of castor oil polyoxyethylene ether, 3% of alkylphenolpolyoxyethyleneether phosphate, 15% of a polyoxyethylenepolyoxypropylene block copolymer, 4% of calcium dodecylbenzenesulfonate, 10% of attapulgite, 5% of organic bentonite, 5% of 2,6-di-tert-butyl p-cresol and the balance maize oil, totaling 100%.

Example 3: 10.2% Thidiazuron•Polyglutamic Acid Dispersible Oil Suspending Agent 0.2% of thidiazuron, 10% of polyglutamic acid, 15% of a polyoxyethylenepolyoxypropylene block copolymer (EO-PO block polymer), 3% of calcium dodecylbenzenesulfonate, 3% of castor oil polyoxyethylene ether, 2% of polyvinyl alcohol, 4% of aluminum-magnesium silicate, 2% of 2,6-di-tert-butyl p-cresol and the balance mineral oil, totaling 100%.

Example 4: 20.25% Thidiazuron•Polyglutamic Acid Dispersible Oil Suspending Agent 0.25% of thidiazuron, 20% of polyglutamic acid, 3% of alkylphenolpolyoxyethylene ether phosphate, 5% of a polyoxyethylenepolyoxypropylene block copolymer (EO-PO block copolymer), 3% of calcium dodecylbenzenesulfonate, 2% of white carbon black, 4% of organic bentonite, 4% of 2,6-di-tert-butyl p-cresol, 2% of glycerinum and the balance castor oil, totaling 100%.

(II) Processing and Examples of Water Dispersible Granules

The active components A and B were mixed with adjuvants and fillers uniformly according to proportions of the formulae; the mixture was crushed by an air flow to form wettable powder; then a certain amount of water was added to mix, extrude and prill; and drying and screening were conducted to prepare a water dispersible granule product.

Example 5: 3.06% Thidiazuron•Polyglutamic Acid Water Dispersible Granules

3% of thidiazuron, 0.06% of polyglutamic acid, 5% of lauryl sodium sulfate, 3% of white carbon black, 3% of alkyl sulfonate, 2% of bentonite, 3% of 2-bromo-2-nitryl-propyl-1,3-diol and the balance kaolin, totaling 100%.

Example 6: 24% Thidiazuron•Polyglutamic Acid Water Dispersible Granules

12% of thidiazuron, 12% of polyglutamic acid, 6% of ammonium sulfate, 5% of diatomite and the balance bentonite, totaling 100%.

Example 7: 13% Thidiazuron•Polyglutamic Acid Water Dispersible Granules 0.5% of thidiazuron, 12.5% of polyglutamic acid, 4% of sodium alkylbenzenesulfonate, 4% of lauryl calcium sulfate, 5% of white carbon black, 5% of calcium bicarbonate and the balance light calcium carbonate, totaling 100%.

(III) Processing and Examples of Wettable Powder

The active components thidiazuron and polyglutamic acid were fully and proportionally mixed with various adjuvants and fillers and the like, and the mixture was crushed by an ultrafine pulverizer to obtain the wettable powder.

Example 8: 1.01% Thidiazuron•Polyglutamic Acid Wettable Powder

1% of thidiazuron, 0.01% of polyglutamic acid, 5% of lignosulfonate, 6% of nekal, 4% of bentonite and the balance white carbon black, totaling 100%.

Example 9: 5.2% Thidiazuron•Polyglutamic Acid Wettable Powder

5% of thidiazuron, 0.2% of polyglutamic acid, 4% of nekal, 2% of Chinese honey locust powder, 3% of lauryl sodium sulfate, 2% of a molecular sieve and the balance kaolin, totaling 100%.

Example 10: 11% Thidiazuron•Polyglutamic Acid Wettable Powder

1% of thidiazuron, 10% of polyglutamic acid, 6% of sodium lignosulfonate, 4% of calcium dodecyl sulfonate, 2% of diatomite and the balance white carbon black, totaling 100%.

Example 11: 25.25% Thidiazuron•Polyglutamic Acid Wettable Powder 0.25% of thidiazuron, 25% of polyglutamic acid, 4% of aluminum-magnesium silicate, 3% of sodium dodecyl sulfate, 7% of sodium alkylbenzenesulfonate, % of bentonite and the balance light sodium carbonate, totaling 100%.

(IV) Processing and Examples of Aqueous Solution

The active components A and B were mixed with adjuvants and fillers uniformly according to proportions of the formulae, and the mixture and water were stirred and mixed to obtain an aqueous solution product.

Example 12: 12.1% Thidiazuron•Polyglutamic Acid Aqueous Solution 0.1% of thidiazuron, 12% of polyglutamic acid, 3% of alkylarylpolyoxyetheneether phosphate, 2% of organic silicon, 8% of urea, 4% of sodium dodecylbenzenesulfonate, 2.5% of propylene glycol and the balance water, totaling 100%.

Example 13: 14.1% Thidiazuron•Polyglutamic Acid Aqueous Solution 0.1% of thidiazuron, 14% of polyglutamic acid, 9% of dodecylbenzene sulfonic acid, 2% of sodium acetate, 15% of kaolin, 3% of ammonium hydroxide and the balance water, totaling 100%.

Example 14: 16.1% Thidiazuron•Polyglutamic Acid Aqueous Solution 0.1% of thidiazuron, 16% of polyglutamic acid, 3% of monostearate, 6% of polyalkyl silicon ethylene oxide, 4% of nonylphenolpolyoxyethylene ether, 3% of castor oil polyoxyethylene ether and the balance water, totaling 100%.

Example 15: 18.1% Thidiazuron•Polyglutamic Acid Aqueous Solution 0.1% of thidiazuron, 18% of polyglutamic acid, 5% of polyalkyl silicon ethylene oxide, 2% of glycerol, 1% of hydroxy propyl cellulose, 2% of sodium benzoate, 1.5% of a polyisosuccinic anhydride-polyethylene glycol copolymer and the balance water, totaling 100%.

Example 16: 20.1% Thidiazuron•Polyglutamic Acid Aqueous Solution 0.1% of thidiazuron, 20% of polyglutamic acid, 2% of dimethyl phthalate, 5% of allyl carbonate, 0.5% of N-n-octylpyrrolidone, 4% of monopalmitate, 3% of polyethylene glycol, 2% of hydroxyethyl cellulose and the balance water, totaling 100%.

Example 17: 22.1% Thidiazuron•Polyglutamic Acid Aqueous Solution 0.1% of thidiazuron, 22% of polyglutamic acid, 1% of hydroxy propyl cellulose, 4% of nonylphenolpolyoxyethylene ether, 3% of isopropylene glycol, 1.8% of a polyisosuccinic anhydride-polyethylene glycol copolymer and the balance water, totaling 100%.

II. Pesticide Effect Verification Test (I) Bioassay Examples

1. Comprehensive Assay Test of Compounding Thidiazuron and Polyglutamic Acid on Growth Regulation of Indica Thidiazuron and polyglutamic acid were diluted with acetone according to a certain concentration and were sprayed to stems and leaves of crops, and influence of concentrations on growth of crops is assayed in the field, including comprehensive evaluation on plant height, spike number, setting percentage, disease-resistant condition, yield condition and the like of the crops.

Plant height control rate=(plant height of a clean water control group-processed plant height)/plant height of the clean water control group*100%

Spike number increase ratio=(processed plant spike number-plant spike number of a clean water control group)/plant spike number of the clean water control group*100%

Setting percentage=filled grain number per spike/total grain number per spike*100%

Prevention effect=(disease index of a clean water control group-processed disease index)/disease index of the clean water control group*100%

Yield per mu increase ratio=(processed yield per mu-yield per mu of a clean water control group)/yield per mu of the clean water control group*100%

TABLE 1

Summery of comprehensive assay of compounding thidiazuron and polyglutamic acid on growth regulation of indica

| Name of Pesticide | Dosage (a.i.mg/kg) | Plant Height (cm) | Plant Height Control Rate (%) | Spike Number of Single Plant (grains) | Spike Number Increase Ratio (%) | Total Grain Number of Spike (grains) | filled grain number per spike (grains) | Setting Percentage (%) | Disease Index of Banded Sclerotial Blight | Prevention Effect (%) | Output (667 M²) | Increase Ratio (%) |
|---|---|---|---|---|---|---|---|---|---|---|---|---|
| Thi:Poly = 1:0.008 | 50 | 116.0 | 9.1 | 18.8 | 8.0 | 144.2 | 132.8 | 92.1 | 7.9 | 73.2 | 555.5 | 9.0 |
| Thi:Poly = 1:0.01 | 50 | 114.5 | 10.2 | 19.1 | 9.8 | 148.2 | 138.6 | 93.5 | 6.8 | 76.9 | 565.5 | 11.0 |
| Thi:Poly = 1:0.0125 | 50 | 112.3 | 12.0 | 19.3 | 10.9 | 149.0 | 140.7 | 94.4 | 6.6 | 77.5 | 571.5 | 12.1 |
| Thi:Poly = 1:0.02 | 50 | 111.4 | 12.7 | 19.5 | 12.1 | 151.7 | 144.9 | 95.5 | 6.5 | 78.1 | 577.5 | 13.3 |
| Thi:Poly = 1:0.04 | 50 | 110.1 | 13.8 | 19.7 | 13.2 | 153.6 | 148.1 | 96.4 | 6.2 | 78.9 | 584.0 | 14.6 |
| Thi:Poly = 1:0.1 | 50 | 108.4 | 15.0 | 19.9 | 14.4 | 149.2 | 144.9 | 97.1 | 6.0 | 79.6 | 588.0 | 15.4 |
| Thi:Poly = 1:1 | 50 | 107.6 | 15.7 | 20.1 | 15.5 | 154.8 | 151.4 | 97.8 | 5.7 | 80.6 | 593.5 | 16.5 |
| Thi:Poly = 1:10 | 50 | 106.5 | 16.6 | 20.2 | 16.1 | 155.2 | 151.3 | 97.5 | 5.3 | 82.2 | 597.0 | 17.1 |
| Thi:Poly = 1:25 | 50 | 107.6 | 15.7 | 19.8 | 13.8 | 153.6 | 148.5 | 96.7 | 5.4 | 81.6 | 593.0 | 16.4 |

TABLE 1-continued

Summery of comprehensive assay of compounding thidiazuron and polyglutamic acid on growth regulation of indica

| Name of Pesticide | Dosage (a.i.mg/kg) | Plant Height | | Spike Number | | Setting Percentage | | | Disease Control | | Production Increase Ratio | |
|---|---|---|---|---|---|---|---|---|---|---|---|---|
| | | Plant Height (cm) | Control Rate (%) | Spike Number of Single Plant (grains) | Increase Ratio (%) | Total Grain Number of Spike (grains) | filled grain number per spike (grains) | Setting Percentage (%) | Disease Index of Banded Sclerotial Blight | Prevention Effect (%) | Output (667 M²) | Increase Ratio (%) |
| Thi:Poly = 1:50 | 50 | 109.2 | 14.4 | 19.7 | 13.2 | 148.9 | 142.8 | 95.9 | 5.9 | 79.9 | 590.5 | 15.9 |
| Thi:Poly = 1:80 | 50 | 110.1 | 13.8 | 19.5 | 12.1 | 152.7 | 145.2 | 95.1 | 6.1 | 79.4 | 587.0 | 15.2 |
| Thi:Poly = 1:100 | 50 | 110.4 | 13.5 | 19.5 | 12.1 | 150.1 | 142.3 | 94.8 | 6.3 | 78.7 | 585.0 | 14.8 |
| Thi:Poly = 1:120 | 50 | 111.3 | 12.8 | 19.3 | 10.9 | 149.8 | 141.3 | 94.3 | 6.4 | 78.4 | 583.5 | 14.5 |
| Thi:Poly = 1:140 | 50 | 112.0 | 12.2 | 19.2 | 10.3 | 149.1 | 140.3 | 94.1 | 6.5 | 77.8 | 580.5 | 13.9 |
| Thi:Poly = 1:160 | 50 | 113.1 | 11.3 | 19.1 | 9.8 | 148.7 | 138.9 | 93.4 | 6.8 | 77.0 | 577.0 | 13.2 |
| Thi:Poly = 1:180 | 50 | 114.3 | 10.5 | 19.1 | 9.8 | 147.2 | 136.9 | 93.0 | 6.9 | 76.5 | 570.0 | 11.9 |
| Thi:Poly = 1:200 | 50 | 115.1 | 9.8 | 19.0 | 9.2 | 146.8 | 135.4 | 92.2 | 7.1 | 75.8 | 568.0 | 11.5 |
| Thi:Poly = 1:220 | 50 | 116.6 | 8.6 | 18.8 | 8.0 | 146.1 | 134.0 | 91.7 | 8.2 | 72.1 | 559.5 | 9.8 |
| Thidiazuron | 50 | 121.2 | 5.0 | 18.1 | 4.0 | 145.7 | 132.2 | 90.7 | 14.8 | 49.8 | 537.5 | 5.5 |
| Polyglutainic acid | 50 | 121.9 | 4.4 | 18.2 | 4.6 | 143.3 | 131.2 | 91.6 | 21.1 | 28.6 | 535.5 | 5.1 |
| Clean water control group (CK) | — | 127.6 | — | 17.4 | — | 128.7 | 109.8 | 85.3 | 29.5 | — | 509.6 | — |

Note:
Thidiazuron is abbreviated as "Thi" and polyglutamic acid is abbreviated as "Poly" in the table. Pesticide application stage: blooming stage, in which the indica plant had not been or had been suffered from banded sclerotial blight. Pesticide application number of times: 2 times, 8 days as a pesticide application interval. Pesticide application mode: stem and leaf spraying. Investigation stage: later indica grouting stage. In the test, indexes such as plant height, spike number, disease index and setting number are processed mean values.

It is found by the inventors through experiments that thidiazuron and polyglutamic acid play a good synergistic promoting role. The compounded thidiazuron and polyglutamic acid in different proportions are obvious in regulating growth of indica compared with individual thidiazuron and polyglutamic acid as well as the clean water control group. The compounded thidiazuron and polyglutamic acid has the main advantages that 1, thidiazuron as the plant growth regulator can promote plant cell division and plant growth, and in the process, rice needs to absorb more nutrients (such as fertilizers, amino acids, humic acid and other nutritional organic matters) from outside to meet the plant growth, and polyglutamic acid as a metabolite of beneficial bacteria can serve as a fertilizer to provide nutrients needed by thidiazuron in promoting growth of rice. Nutrient conduction and disease resistance and stress resistance of the rice plants are promoted by means of synergism effect of thidiazuron and polyglutamic acid. In the mature period of rice, thidiazuron and polyglutamic acid have an obvious enhancing effect to unit yield per mu, and the yield per mu increase ratio is up to 17.1%. 2, it is found in the test that polyglutamic acid itself also has a function of regulating plant growth and plays a complementary role with thidiazuron, so that the plant height of rice can be reduced effectively and the up-down nutrient conduction ability of the plant can be improved effectively. Furthermore, lodging resistance in rice growth can be improved by reducing the plant height. 3, thidiazuron used as a single dosage has certain disease resistance and stress resistance to plant growth while polyglutamic acid has certain immunity to crop diseases. Joint application of polyglutamic acid and thidiazuron has a good synergism effect. It can be seen from analysis in the above table that compared with the single dosage and the clean water control group, polyglutamic acid and thidiazuron have a good prevention effect to banded sclerotial blight of indica due to synergism effect between polyglutamic acid and thidiazuron.

(II) Field Pesticide Effect Verification Test

1. Field Comprehensive Test of Mixing Thidiazuron and Polyglutamic Acid on Growth Regulation and Disease Resistance and Production Increase of Maize Crops Sorghum variety: Suyu 23.

Pesticide application stage: a big horn stage of maize and a blooming stage of maize in which diseases such as Southern corn leaf blight are prone to occur.

Pesticide application number of times: 2 times, 6 days asan interval. The examples of the preparation of the present invention are sprayed for three repeated times, and the result is the mean value.

TABLE 2

Field comprehensive test of mixing thidiazuron and polyglutamic acid on growth regulation of maize

| Name of Pesticide | Dosage (a.i. mg/kg) | Plant Height (cm) | Control Rate (%) | Stem Diameter (cm) | Increase Ratio (%) | Southern corn leaf blight | Prevention Effect (%) | Thousand seed weight (g) | Increase Ratio (%) | Output (667M$^2$) | Increase Ratio (%) |
|---|---|---|---|---|---|---|---|---|---|---|---|
| Example 1: 2.025% thidiazuron · polyglutamic acid dispersible oil suspending agent (80:1) | 40 | 120.2 | 11.8 | 2.66 | 12.2 | 7.32 | 75.73 | 264.8 | 12.1 | 687.6 | 14.4 |
| Example 2: 6.6% thidiazuron · polyglutamic acid dispersible oil suspending agent (10:1) | 40 | 116.2 | 14.7 | 2.77 | 16.8 | 6.32 | 79.04 | 271.2 | 14.8 | 705.0 | 17.3 |
| Example 3: 10.2% thidiazuron · polyglutamic acid dispersible oil suspending agent (1:50) | 40 | 116.3 | 14.6 | 2.74 | 15.5 | 7.02 | 76.71 | 269.8 | 14.2 | 691.9 | 15.1 |
| Example 4: 20.25% thidiazuron · polyglutamic acid dispersible suspending agent (1:80) | 40 | 116.9 | 14.2 | 2.72 | 14.6 | 7.23 | 76.02 | 267.1 | 13.1 | 686.9 | 14.3 |
| Example 5: 3.06% thidiazuron · polyglutamic acid water dispersible granules (50:1) | 40 | 119.0 | 12.7 | 2.69 | 13.4 | 6.65 | 77.94 | 266.8 | 13.0 | 691.3 | 15.0 |
| Example 6: 24% thidiazuron· polyglutamic acid water dispersible granules (1:1) | 40 | 114.7 | 15.9 | 2.81 | 18.7 | 6.09 | 79.81 | 273.5 | 15.8 | 710.0 | 18.1 |
| Example 7: 13% thidiazuron · polyglutamic acid water dispersible granules (1:25) | 40 | 115.8 | 15.0 | 2.78 | 17.3 | 6.29 | 79.15 | 270.3 | 14.4 | 700.6 | 16.6 |
| Example 8: 1.01% thidiazuron · polyglutamic acid wettable powder (100:1) | 40 | 121.6 | 10.8 | 2.63 | 11.1 | 7.60 | 74.80 | 262.0 | 10.9 | 677.6 | 12.7 |
| Example 9: 5.2% thidiazuron · polyglutamic acid wettable powder (25:1) | 40 | 117.9 | 13.5 | 2.73 | 15.1 | 6.67 | 77.87 | 268.2 | 13.6 | 699.4 | 16.4 |
| Example 10: 11% thidiazuron · polyglutamic acid wettable powder (1:10) | 40 | 113.7 | 16.6 | 2.84 | 19.7 | 5.89 | 80.45 | 274.2 | 16.1 | 711.2 | 18.3 |
| Example 11: 25.25% thidiazuron · polyglutamic acid wettable powder (1:100) | 40 | 117.7 | 13.6 | 2.71 | 14.2 | 7.55 | 74.94 | 266.4 | 12.8 | 683.2 | 13.7 |
| Example 12: 12.1% thidiazuron · polyglutamic acid aqueous solution (1:120) | 40 | 118.7 | 12.9 | 2.70 | 13.8 | 7.73 | 74.35 | 265.2 | 12.3 | 682.0 | 13.5 |
| Example 13: 14.1% thidiazuron · polyglutamic acid aqueous solution (1:140) | 40 | 120.3 | 11.7 | 2.69 | 13.5 | 7.82 | 74.07 | 263.4 | 11.5 | 680.7 | 13.2 |

TABLE 2-continued

Field comprehensive test of mixing thidiazuron and polyglutamic acid on growth regulation of maize

| Name of Pesticide | Dosage (a.i. mg/kg) | Plant Height (cm) | Control Rate (%) | Stem Diameter (cm) | Increase Ratio (%) | Southern corn leaf blight | Prevention Effect (%) | Thousand seed weight (g) | Increase Ratio (%) | Output (667M²) | Increase Ratio (%) |
|---|---|---|---|---|---|---|---|---|---|---|---|
| Example 14: 16.1% thidiazuron · polyglutamic acid aqueous solution (1:160) | 40 | 121.8 | 10.6 | 2.66 | 12.3 | 8.12 | 73.06 | 261.7 | 10.8 | 678.2 | 12.8 |
| Example 15: 18.1% thidiazuron · polyglutamic acid aqueous solution (1:180) | 40 | 122.1 | 10.4 | 2.65 | 11.9 | 8.31 | 72.44 | 260.8 | 10.4 | 675.7 | 12.4 |
| Example 16: 20.1% thidiazuron · polyglutamic acid aqueous solution (1:200) | 40 | 122.7 | 10.0 | 2.64 | 11.5 | 8.93 | 70.40 | 260.3 | 10.2 | 674.5 | 12.2 |
| Example 17: 22.1% thidiazuron · polyglutamic acid aqueous solution (1:220) | 40 | 124.1 | 9.0 | 2.61 | 10.1 | 9.62 | 68.10 | 257.6 | 9.1 | 663.5 | 10.4 |
| thidiazuron | 40 | 129.0 | 5.4 | 2.50 | 5.4 | 14.74 | 51.11 | 249.0 | 5.4 | 637.9 | 6.1 |
| polyglutamic acid | 40 | 131.5 | 3.5 | 2.48 | 4.5 | 25.45 | 15.59 | 246.0 | 4.1 | 633.7 | 5.4 |
| Clean water control group (CK) | — | 136.3 | — | 2.37 | — | 30.15 | — | 236.2 | — | 601.1 | — |

It can be seen from experimental data in the table 2 that thidiazuron and polyglutamic acid have an obvious synergism effect, specifically: 1, maize plants are promoted to grow regularly, weak seedlings are promoted to be strong, big seedlings become dwarf, leaves are wide, thick and strongly green, chlorophyll is increased, the functional stage of the leaves is prolonged, the photosynthesis is enhanced, vigorous growing control and excessive growth of maize are controlled effectively, the stem diameters of maize are increased, nutrient conduction is promoted, and lodging of maize is prevented; 2, disease resistance and stress resistance of the maize plants are induced, so that the health benefit of the plants is improved; and 3, full seeds of maize are promoted, the thousand seed weight of maize seeds is improved, the per unit output of maize is improved obviously, and the unit yield per mu increase ratio is up to 18.3%.

What is claimed is:

1. A pesticide composition having a synergism effect, comprising two active components A and B, wherein the active component A is thidiazuron and the active component B is polyglutamic acid, and
    the weight ratio of the active component A to the active component B is 1:(0.01-200).
2. The composition according to claim 1, wherein the weight ratio of the active component A to the active component B is 1:(0.011-180).
3. The composition according to claim 2, wherein the weight ratio of the active component A to the active component B is (1:0.0125-180).
4. The composition according to claim 1, wherein the composition is prepared into a dosage form permissible in pesticide from the active components and a pesticide adjuvant.
5. The composition according to claim 4, wherein the dosage form is a dispersible oil suspending agent, wettable powder, water dispersible granules or an aqueous solution.
6. The composition according to claim 4, wherein the pesticide adjuvant is selected from one or more of a carrier, a solvent, a dispersant, a wetting agent, a tackifier, a thickener, an adhesive, a surfactant and a fertilizer.
7. A method comprising applying the pesticide composition according to claim 1 to plants or seeds that will produce the plants so as to promote or regulate growth of the plants.
8. A method comprising applying the pesticide composition according to claim 2 to plants or seeds that will produce the plants so as to promote or regulate growth of the plants.
9. A method comprising applying the pesticide composition according to claim 3 to plants or seeds that will produce the plants so as to promote or regulate growth of the plants.
10. A method comprising applying the pesticide composition according to claim 4 to plants or seeds that will produce the plants so as to promote or regulate growth of the plants.
11. A method comprising applying the pesticide composition according to claim 5 to plants or seeds that will produce the plants so as to promote or regulate growth of the plants.
12. The composition according to claim 1, wherein the polyglutamic acid is γ-polyglutamic acid.

* * * * *